US009805231B2

(12) United States Patent
Savarese et al.

(10) Patent No.: US 9,805,231 B2
(45) Date of Patent: Oct. 31, 2017

(54) GOLF DATA COLLECTION SYSTEM WITH RFID IN GOLF CLUB

(71) Applicant: Radar Corporation, San Ramon, CA (US)

(72) Inventors: Chris Savarese, Danville, CA (US); Susan McGill, Redwood City, CA (US)

(73) Assignee: TAG GOLF, LLC, Ridgeland, MS (US)

(*) Notice: Subject to any disclaimer, the term of this patent is extended or adjusted under 35 U.S.C. 154(b) by 207 days.

(21) Appl. No.: 14/207,343

(22) Filed: Mar. 12, 2014

(65) Prior Publication Data

US 2014/0329613 A1    Nov. 6, 2014

Related U.S. Application Data

(60) Provisional application No. 61/780,917, filed on Mar. 13, 2013.

(51) Int. Cl.
| | |
|---|---|
| A63B 69/36 | (2006.01) |
| A63B 67/02 | (2006.01) |
| A63B 57/00 | (2015.01) |
| G06K 7/10 | (2006.01) |
| H04W 4/00 | (2009.01) |
| G06Q 10/06 | (2012.01) |
| H04W 4/02 | (2009.01) |
| G09B 19/00 | (2006.01) |

(52) U.S. Cl.
CPC ........ *G06K 7/10366* (2013.01); *H04W 4/008* (2013.01); *G06Q 10/0639* (2013.01); *G09B 19/0038* (2013.01); *H04W 4/023* (2013.01)

(58) Field of Classification Search
CPC . A63B 24/0003; A63B 24/0006; A63B 60/42; A63B 60/46
See application file for complete search history.

(56) References Cited

U.S. PATENT DOCUMENTS

| | | | | |
|---|---|---|---|---|
| 5,689,431 A * | 11/1997 | Rudow | ............. | A63B 24/0021 340/990 |
| 6,023,225 A * | 2/2000 | Boley | .................... | A63B 55/00 206/315.3 |
| 8,131,214 B2 * | 3/2012 | Braun | ................. | H04M 1/7253 455/41.1 |
| 2004/0073325 A1 * | 4/2004 | Reeves | ............. | A63B 71/0669 700/91 |
| 2005/0037872 A1 * | 2/2005 | Fredlund | ............ | A63B 24/0021 473/407 |
| 2005/0215340 A1 * | 9/2005 | Stites | ................. | A63B 69/3614 473/233 |
| 2005/0272516 A1 * | 12/2005 | Gobush | ............. | A63B 24/0003 473/200 |

(Continued)

OTHER PUBLICATIONS

"What is NFC?", Sep. 25, 2012, Identive NFC, https://web.archive.org/web/20120925074352/http://www.identivenfc.com/en/what-is-nfc.*

(Continued)

*Primary Examiner* — Kevin Y Kim
(74) *Attorney, Agent, or Firm* — Blakely, Sokoloff, Taylor & Zafman LLP

(57) ABSTRACT

A golf data collection system can use a near field communication system in a data processing application to record golf club identifiers and golf strokes, taken (with the identified club) at GPS identified positions.

20 Claims, 2 Drawing Sheets

(56) References Cited

U.S. PATENT DOCUMENTS

| | | | | |
|---|---|---|---|---|
| 2007/0239981 A1* | 10/2007 | Lessing | ............... | G06K 7/10237 713/164 |
| 2008/0238610 A1* | 10/2008 | Rosenberg | ............. | G06Q 20/20 340/5.7 |
| 2009/0098825 A1* | 4/2009 | Huomo | .................. | G06Q 20/20 455/41.1 |
| 2009/0156190 A1* | 6/2009 | Fisher | .................... | G06Q 40/02 455/418 |
| 2011/0039513 A1* | 2/2011 | Carlstrom | ............... | G08B 25/08 455/404.1 |
| 2011/0319016 A1* | 12/2011 | Gormley | ............... | H04B 5/0012 455/41.1 |
| 2012/0035003 A1* | 2/2012 | Moran | .................... | A63B 57/00 473/407 |
| 2012/0040611 A1* | 2/2012 | Griffin | ............... | H04W 52/0254 455/41.1 |
| 2013/0324274 A1* | 12/2013 | Stites | ................. | G09B 19/0038 473/209 |
| 2014/0213382 A1* | 7/2014 | Kang | ................. | A63B 69/3632 473/223 |

OTHER PUBLICATIONS

"What is NFC?", Feb. 9, 2013, RapidNFC, https://web.archive.org/web/20130209012154/http://rapidnfc.com/what_is_nfc.*

* cited by examiner

GOLF DATA COLLECTION SYSTEM WITH RFID IN GOLF CLUB

This application claims the benefit of U.S. Provisional Patent Application No. 61/780,917 filed on Mar. 13, 2013; this application claims the benefit of the provisional's filing date under 35 U.S.C. §119(e), which provisional application is hereby incorporated herein by reference in its entirety.

BACKGROUND

Radar Corp prior art includes golf data collection systems that incorporate RFID tags on golf clubs. Prior art describes golf data collection systems that include RFID tags on golf clubs and an RFID reader in the golf data collection device.

SUMMARY OF THE DESCRIPTION

This invention describes such a golf data collection device that registers a stroke when the golfer taps or touches the golf club to the device or brings the tagged golf club into close proximity to a sensing device in the RFID reader. The golfer may be instructed to tap the club to the device to ensure that the RFID tag on the golf club is close enough to the RFID reader to be read successfully. The golf collection device may contain an impact sensing device, such as an impact sensor, motion sensor, vibration sensor, accelerometer, motion sensing device, magnetic sensor, capacitive sensor or similar. The device records a golf stroke when the device registers an impact or when a sensor in the device detects close proximity, such as when the golfer taps or touches the golf club on the golf data device, and an RFID tag is read by the RFID reader in the device. The combination of tapping the device or bringing the tagged golf club into close proximity to a sensor in the device then reading the RFID tag in the golf club causes the golf data collection device to record a golf stroke. In this way a stroke is definitively recorded when the golfer deliberately taps the club containing the RFID tag to the golf data collection device or brings the tagged club into close proximity. The sensing mechanism in the RFID reader device can save battery power by only turning on the RFID reader after the sensor in the device detects that a tagged golf club is in close proximity or physically tapped or touched the RFID reader device.

A golf data collection system comprised of an RFID tag on a golf club, and a golf data collection device that contains an RFID reader and optionally a GPS receiver. A golf stroke is recorded when the golfer taps or touches the golf club to the device or brings a tagged golf club into close proximity of the RFID reader device. The system can be programmed to look for a sequence of events in the order of: (1) detect RFID tag for a particular golf club and then (2) detect tap; a tap that is detected without an RFID tag being also detected will be ignored in one embodiment such that a golf stroke will not be recorded. The sequence of events may also be 1) detect tap or close proximity of golf club or other object, 2) then poll for RFID tag, 3) if RFID tag detected (when polling for any RFID tags), record the stroke location and type of club being used. This may allow for using less battery power by only turning on the reader upon detection of an impact such as a tap or touch.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
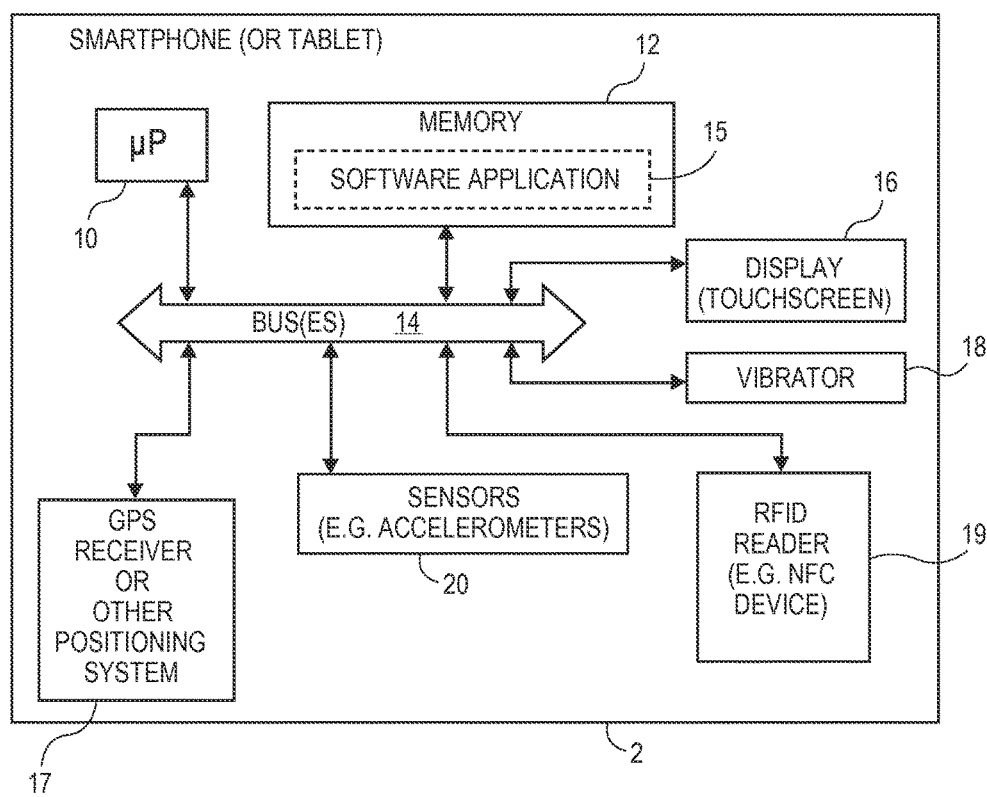
FIG. 1 is a block diagram of a system for use with one or more embodiments described herein.

A golf data collection system is described in U.S. patent application Ser. No. 12/258,348, filed Oct. 24, 2008, now issued as U.S. Pat. No. 9,005,047, which is incorporated herein by reference in its entirety. An embodiment of this system includes a passive RFID tag on the golf club and a golf data collection device that includes an RFID reader and location positioning system, such as a GPS. This device may be worn on the person and/or it may be a handheld device. The passive RFID tag on the golf club contains a unique identifier and communicates this identifier to the device as previously described in other embodiments of this system. A feature of RFID tags and readers is the read range or the distance between tag and reader to ensure successful reading of the tag by the reader. Some passive RFID tags and readers have a read range of up to one foot. In this embodiment of the golf data collection system, when the golfer wishes to record a stroke, the golfer moves the butt end of the club, containing the RFID tag, towards the device containing the RFID reader such that the RFID tag in the club is close enough to the RFID reader to be read successfully. In one embodiment, the golfer may be instructed to tap or touch the club to the device to ensure that the tag is close enough to the RFID reader to be read successfully.

In one embodiment, the golf data collection device may include an impact sensing device, such as a motion sensor, vibration sensor, impact sensor, or accelerometer, such that an impact on the device can be registered. The golf data collection device may include proximity sensing means such as motion sensors, light sensor, magnetic sensor, capacitive sensor, etc. The golfer causes the golf data collection system to record a stroke by tapping or touching the grip end of the golf club against the RFID reader or by bringing the tagged golf club within close proximity of the RFID reader device. The device senses the impact by the club or proximity of the club on the device and causes the RFID reader to read the RFID tag on the golf club.

In one embodiment the power supply to the RFID reader is controlled by a microprocessor in the device. When the impact sensing device registers an impact on the device, such as an impact caused by the golfer tapping or touching the club to the data collection device, or when the proximity sensor senses close proximity of the tagged golf club (or other object) the microprocessor provides power to the RFID reader to start reading RFID tags. In another embodiment, the RFID reader may be in a low-power or sleep state. When the impact sensing device registers an impact on the device, or when the proximity sensor senses close proximity of the tagged golf club (or other object) the microprocessor prompts the RFID reader to enter a full-power state and to start reading tags. These techniques provide power-saving benefits to the golf data collection device, by ensuring that the RFID reader is not continuously on or in a full-power state.

Figure 2:
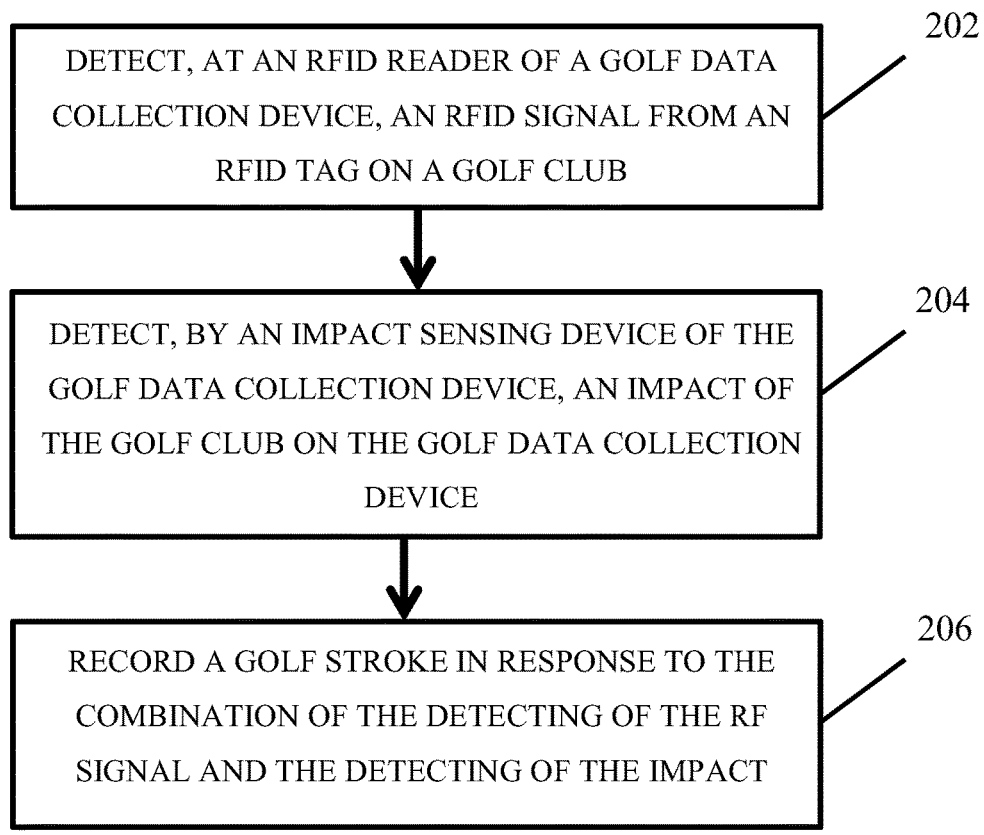
FIG. 2 is a flowchart of a method of recording a golf stroke in accordance with an embodiment.

In yet another embodiment, the combination of an impact or close proximity of tagged club or other object registered by the device and the reading of an RFID tag within a short period of time, such as 1 second or 5 seconds or other predetermined period of time, causes the golf data collection system to record a stroke with the club associated with the RFID tag that was read by the RFID reader. Referring to FIG. 2, at operation 202, an RFID reader of a golf data collection device detects an RF signal from an RFID tag on a golf club. In this embodiment, a reading of an RFID tag alone does not cause the data collection system to record a stroke. At operation 204, an impact sensing device of the golf data collection device detects an impact of the golf club on the golf data collection device. At operation 206, a golf stroke may be recorded in response to the combination of the detecting of the RF signal and the detecting of the impact. The action of tapping or touching the tag to the reader in addition to reading the RFID tag constitutes the recording of the stroke. The reading of the RFID tag may be before or after the impact is detected on the device. This combination of events, over a predetermined time window, limits the accidental recording of a stroke, such as when a tag is accidentally read or when the device with RFID reader is accidentally jostled or impacted. The golfer must take the deliberate action of tapping or touching the RFID reader in order for a stroke to be recorded. Other golf data collection systems are described in U.S. Pat. No. 8,226,495 and U.S. patent application Ser. No. 12/170,413, filed Jul. 9, 2008, and the various embodiments described herein can be used with one or more of the systems described in U.S. Pat. No. 8,226,495 and U.S. application Ser. No. 12/170,413, both of which are incorporated herein by reference in their entirety.

The functions of the golf data collection device may be incorporated into a smart phone or PDA (e.g. a tablet such as an iPad), using the hardware supplied with the smart phone or PDA and an application running on the smart phone or PDA. For example, in one embodiment, the golfer runs the golf data collection application on the smart phone during a round of golf. When the golfer wishes to record a stroke, he taps or touches the golf club to the smart phone. A sensor equipped in the smart phone, such as a set of one or more accelerometers, senses the impact and sends that information to the application. The application then instructs the RFID reader, equipped in the smart phone, to take a reading of the RFID tag on the golf club.

FIG. 1 shows an example of such a smart phone and such a golf data collection application; for example, the smart phone can be a smart phone 2 which includes an NFC (near field communication) reader 19 that operates as a close proximity RFID reader and the golf data collection application 15 can be a GPS golf application that runs on the smart phone, such as the smart phone app known as Golf-shot. The smart phone 2 includes a set of one or more microprocessors 10 (or other processing systems) and a memory 12 (such as a DRAM or non-volatile flash memory or a combination of DRAM and flash memory). The memory 12 is a non-transitory machine readable storage media that stores executable instructions (and data) for the various programs (e.g. web browser, email, cell phone software, operating system software, etc.) in addition to storing the executable instructions for the golf data collection application 15. Those instructions for application 15 can cause the smart phone to perform any one of the methods described and/or claimed herein. Those methods can include the use, in those methods, of the sensor 20, which can be a set of one or more accelerometers in commercially available, general purpose smart phones (e.g. smart phone 2) or other sensors described herein which can detect close proximity of a tagged club (without requiring the club to contact the smart phone 2); and those methods can also include the use of the GPS receiver (or other position system) 17 in the smart phone 2 and the RFID reader (NFC device) 19 in processes of the methods. The GPS receiver 17 can be used by the golf data collection application 15 to show the position of a golfer on a map of the current golf course (on which the golfer is playing) and can be used to record the position of a golf stroke once the software application 15 determines (from data from the sensors 20 and from data from RFID reader 19) that a golf stroke has occurred because the golfer has caused an impact on the RFID reader 19 in the smart phone (as indicated by data from the sensors 20) and because the RFID reader 19 has detected the presence of a single club's RFID tag in the field of illumination of the RFID reader. The map of the current golf course can be displayed on display 16 of the smart phone 2; display 16 can be a conventional touch screen display that displays an output (e.g. a map) and also accepts touch inputs. The components shown in FIG. 1 of smart phone 2 can be interconnected using known architectures that employ one or more buses such as bus(es) 14. The smart phone 2 can also include a conventional vibrator 18 that can be used by the software application 15 to indicate, by causing the vibrator 18 to vibrate, that a golf stroke was recorded or that an impact on the RFID reader was detected. Since the RFID reader 19 and the sensors 20 can be found on commercially available smart phones, the software application 15 can use the functionality of those components to determine, as described herein, whether a golf stroke has occurred. As a golfer plays on the course over time, the software application 15 can use the GPS receiver 17, the sensors 20 and the RFID reader 19 to collect and record each golf stroke and this data can include the club used to take a stroke and the GPS position of each such stroke. In addition, the map of the current golf course on the display can show any one of those positions and also can show the golfer's current position on the map.

The RFID reader 19 can be a NFC device that has an intentionally limited detection range such that it cannot detect RFID tags that are more than about 1 inch or about 5 inches or about 12 inches (depending on the embodiment) away from the RFID reader. In one embodiment, the software application can use one or more timers to determine whether a detected impact (detected by sensors 20) (or close proximity sensing without an impact) is within a predetermined period of time (such as a predetermined time window of about 1 second or about 5 seconds) of when an RFID tag was detected. In one embodiment, the one or more timers can be used in one or more sequences of detection described herein. For example, the one or more timers can be used to set a time limit for polling for RFID tags after an impact was detected; in this example, the smart phone 2 can, after detecting an impact through the sensors 20 (or the close proximity of the tagged golf club to one or more sensing devices in the smart phone 2), start a timer and turn on the RFID reader 10 and begin polling/searching for RFID tags (e.g. any RFID tags in close proximity of less than about 1 inch or about 5 inches, etc.) and after the timer expires (or after an RFID tag has been detected before the timer expires), the RFID reader 19 is turned off (to conserve battery power) and the software application 15 determines from the combination of data from sensors 20 and RFID reader 19 whether a golf stroke has occurred. If, after detecting an impact via sensors 20, no RFID tag is detected during the polling period of time (e.g. a predetermined time window) set by the timer, then no stroke is recorded, but if (after detecting an impact) only a single RFID tag is detected by RFID reader 19 (and no collisions of multiple RFID tags are detected) within the polling period, then the software application 15 records the golf stroke and records the current GPS position (from GPS receiver 17) with that golf stroke (e.g. club ID "Y" was used to take a stroke at GPS position "ABC").

What is claimed is:

1. A method of recording a golf stroke comprising:
   detecting, by an RFID reader of a golf data collection device, an RFID tag on a golf club;
   detecting, by an impact sensing device of the golf data collection device, an impact of the golf club against the golf data collection device; and
   recording a golf stroke in response to the impact sensing device detecting the impact on the golf data collection device within a predetermined time window of the RFID reader detecting the RFID tag.

2. The method of claim 1, wherein the recording comprises:
   starting a timer in response to detecting the RFID tag, the timer being used relative to the predetermined time window to determine whether the impact occurs within the predetermined time window.

3. The method of claim 1, wherein the golf data collection device is a wearable device.

4. The method of claim 1, wherein the golf data collection device is a PDA.

5. A method of recording a golf stroke, the method comprising:
   detecting, by an RFID reader of a golf data collection device, an RF signal from an RFID tag on a golf club;
   detecting, by an impact sensing device of the golf data collection device, an impact of the golf club against the golf data collection device; and
   recording a golf stroke in response to a combination of the RFID reader detecting the RF signal and the impact sensing device detecting the impact on the golf data collection device, wherein the recording of the golf stroke includes a club identifier received from the RFID tag.

6. The method of claim 5, wherein the golf data collection device is a smart phone having a set of one or more accelerometers and a GPS receiver and includes a display which displays an output from a software application that runs on a set of one or more processors in the smart phone, wherein the RFID reader is a near field communication device embedded within the smart phone;
   wherein the software application collects golf data by recording the golf stroke and a GPS position, from the GPS receiver, of a location of the golf stroke, and the software application displays a map, on the display, of the current golf course on which the golf stroke was recorded;
   wherein the software application receives one or more outputs from the set of accelerometers and processes those one or more outputs to determine whether the impact is detected;
   wherein the software application receives an output from the RFID reader to determine whether an RFID tag is detected and to receive an identifier of the golf club from the RFID tag when the RFID tag is detected; and
   wherein the software application determines whether to record the golf stroke based on the combination of the one or more outputs from the set of accelerometers and the output from the RFID reader.

7. The method of claim 6, wherein the software application responds to a determination that the impact was detected, after the impact was detected, by causing the RFID reader to poll or search for the presence, in close proximity of no more than 5 inches from the RFID reader, of RFID tags.

8. The method of claim 6, wherein the software application causes a vibrator of the smart phone to vibrate when the software application determines to record the golf stroke.

9. The method of claim 6, wherein the software application causes a vibrator of the smart phone to vibrate when the software application determines that the impact was detected.

10. The method of claim 5, wherein the golf data collection device is a wearable device.

11. The method of claim 5, wherein the golf data collection device is a PDA.

12. A machine readable non-transitory storage medium storing executable instructions which when executed by a machine cause the machine to perform a method of recording a golf stroke comprising:
    detecting, by an RFID reader of a golf data collection device, an RFID tag on a golf club;
    detecting, by an impact sensing device of the golf data collection device, an impact of the golf club against the golf data collection device; and
    recording a golf stroke in response to the impact sensing device detecting the impact on the golf data collection device within a predetermined time window of the RFID reader detecting the RFID tag.

13. The medium of claim 12, wherein the recording comprises:
    starting a timer in response to detecting an RF signal from the RFID tag, the timer being used relative to the predetermined time window to determine whether the impact occurs within the predetermined time window.

14. The medium of claim 12, wherein the golf data collection device is a wearable device.

15. A machine readable non-transitory storage medium storing executable instructions which when executed by a machine cause the machine to perform a method of recording a golf stroke, the method comprising:
    detecting, by an RFID reader of a golf data collection device, an RF signal from an RFID tag on a golf club;
    detecting, by an impact sensing device of the golf data collection device, an impact of the golf club against the golf data collection device; and
    recording a golf stroke in response to a combination of the RFID reader detecting the RF signal and the impact sensing device detecting the impact on the golf data collection device, wherein the recording of the golf stroke includes a club identifier received from the RFID tag.

16. The medium of claim 15, wherein the golf data collection device is a smart phone having a set of one or more accelerometers and a GPS receiver and includes a display which displays an output from a software application that runs on a set of one or more processors in the smart phone, wherein the RFID reader is a near field communication device embedded within the smart phone;
    wherein the software application collects golf data by recording the golf stroke and a GPS position, from the GPS receiver, of a location of the golf stroke, and the software application displays a map, on the display, of the current golf course on which the golf stroke was recorded;
    wherein the software application receives one or more outputs from the set of accelerometers and processes those one or more outputs to determine whether the impact is detected;
    wherein the software application receives an output from the RFID reader to determine whether an RFID tag is detected and to receive an identifier of the golf club from the RFID tag when the RFID tag is detected; and wherein the software application determines whether to record the golf stroke based on the combination of the one or more outputs from the set of accelerometers and the output from the RFID reader.

17. The medium of claim 16, wherein the software application responds to a determination that the impact was detected, after the impact was detected, by causing the RFID reader to poll or search for the presence, in close proximity of no more than 5 inches from the RFID reader, of RFID tags.

18. The medium of claim 16, wherein the software application causes a vibrator of the smart phone to vibrate when the software application determines to record the golf stroke.

19. The medium of claim 16, wherein the software application causes a vibrator of the smart phone to vibrate when the software application determines that the impact was detected.

20. The medium of claim 15, wherein the golf data collection device is a wearable device.

\* \* \* \* \*